(12) United States Patent
Hayek et al.

(10) Patent No.: US 7,671,607 B2
(45) Date of Patent: Mar. 2, 2010

(54) SYSTEM AND METHOD FOR MEASURING AIR BEARING GAP DISTANCE

(75) Inventors: Charles F. Hayek, Seminole, FL (US); Mark D. DuBois, Brandon, FL (US); Robert H. Chall, Clearwater, FL (US)

(73) Assignee: Honeywell International Inc., Morristown, NJ (US)

( * ) Notice: Subject to any disclaimer, the term of this patent is extended or adjusted under 35 U.S.C. 154(b) by 229 days.

(21) Appl. No.: 11/851,187

(22) Filed: Sep. 6, 2007

(65) Prior Publication Data

US 2009/0067094 A1 Mar. 12, 2009

(51) Int. Cl.
*G01R 27/26* (2006.01)

(52) U.S. Cl. ...................... 324/690; 324/686
(58) Field of Classification Search .............. 324/690, 324/686
See application file for complete search history.

(56) References Cited

U.S. PATENT DOCUMENTS

| | | | |
|---|---|---|---|
| 3,039,316 A | 6/1962 | Slater | |
| 3,056,303 A | 10/1962 | Naylor | |
| 3,365,942 A | 1/1968 | Blazek | |
| 3,439,546 A | 4/1969 | Baker et al. | |
| 3,576,124 A | 4/1971 | O'Connor | |
| 3,670,585 A | 6/1972 | Alexander et al. | |
| 3,769,710 A | 11/1973 | Reister | |
| 3,782,167 A | 1/1974 | Stuelpnagel | |
| 4,003,265 A | 1/1977 | Craig et al. | |
| 4,150,579 A | 4/1979 | Vaughn | |
| 4,244,215 A | 1/1981 | Merhav | |
| 4,515,486 A | 5/1985 | Ide | |
| 4,671,650 A | 6/1987 | Hirzel et al. | |
| 4,711,125 A | 12/1987 | Morrison | |
| 4,723,735 A | 2/1988 | Eisenhaure et al. | |
| 4,917,330 A | 4/1990 | Dulat et al. | |
| 5,067,084 A | 11/1991 | Kau | |
| 5,088,825 A | 2/1992 | Derry et al. | |

(Continued)

FOREIGN PATENT DOCUMENTS

GB 866473 4/1961

(Continued)

OTHER PUBLICATIONS

Benbasat, "An Inertial Measurement Unit for User Interfaces", Sep. 8, 2000, pp. 1-100, Publisher: Massachusetts Institute of Technology, Published in: MA, USA.

(Continued)

*Primary Examiner*—Jeff Natalini
(74) *Attorney, Agent, or Firm*—Fogg & Powers LLC

(57) ABSTRACT

A method of determining the air gap distance between an air bearing pad and an apparatus floating on the air bearing pad comprises coupling a first probe to the air bearing pad; coupling a second probe to the apparatus floating on the air bearing pad, wherein the first and second probes provide the capacitance level between the air bearing pad and the apparatus; converting the capacitance level to a frequency; converting the frequency to a voltage level proportional to the air gap distance; and calculating the air gap distance based on the voltage level.

20 Claims, 5 Drawing Sheets

U.S. PATENT DOCUMENTS

| | | | |
|---|---|---|---|
| 5,099,430 | A | 3/1992 | Hirsch |
| 5,319,577 | A | 6/1994 | Lee |
| 5,357,437 | A | 10/1994 | Polvani |
| 5,396,326 | A | 3/1995 | Knobbe et al. |
| 5,710,559 | A | 1/1998 | Krogmann |
| 5,894,323 | A | 4/1999 | Kain et al. |
| 6,150,826 | A * | 11/2000 | Hokodate et al. ........... 324/662 |
| 6,172,665 | B1 | 1/2001 | Bullister |
| 6,480,008 | B2 * | 11/2002 | Okamoto et al. ............ 324/662 |
| 6,481,672 | B1 | 11/2002 | Goodzeit et al. |
| 6,550,126 | B1 * | 4/2003 | Szettella et al. ............... 29/464 |
| 6,552,667 | B1 * | 4/2003 | Missout et al. ......... 340/870.37 |
| 6,594,623 | B1 | 7/2003 | Wang et al. |
| 6,594,911 | B2 | 7/2003 | Brunstein et al. |
| 6,629,778 | B1 | 10/2003 | Enderle et al. |
| 6,741,209 | B2 | 5/2004 | Lee |
| 6,826,478 | B2 | 11/2004 | Riewe et al. |
| 7,002,886 | B2 * | 2/2006 | Chu et al. ................. 369/53.19 |
| 7,003,399 | B1 | 2/2006 | Chappell |
| 2002/0077189 | A1 | 6/2002 | Tuer et al. |
| 2003/0120425 | A1 | 6/2003 | Stanley et al. |
| 2004/0015323 | A1 | 1/2004 | Boyton |
| 2004/0075737 | A1 | 4/2004 | Kirby |
| 2004/0089083 | A1 | 5/2004 | Bailey |
| 2004/0212803 | A1 | 10/2004 | Siegl et al. |

FOREIGN PATENT DOCUMENTS

| | | |
|---|---|---|
| GB | 878939 | 10/1961 |
| GB | 1015681 | 1/1966 |
| GB | 1284195 | 8/1972 |
| GB | 2166920 | 5/1986 |
| WO | 9505547 | 2/1995 |
| WO | 2004023150 | 3/2004 |

OTHER PUBLICATIONS

El-Sheimy et al., "Structural Monitoring Using Wirelessly Connected MEMS-Based Snesors-Towards System Development", Feb. 18, 2003, pp. 1-10, Publisher: ICPCM, Published in: Cairo, Egypt.

IBM Corp., "The Tracking Cube: A Three Dimensional Input Device", Aug. 1, 1989, pp. 91-95, vol. 32, No. 3B, Publisher: IBM Technical Disclosure Bulletin, Published in: NY, US.

Ng, "The Optical Mouse As a Two-Dimensional Displacement Sensor", "Sensors and Actuators A", Oct. 1, 2003, pp. 21-25, vol. 107, No. 1, Publisher: Elseveier Sequoia S.A., Published in: Lausanne, CH.

* cited by examiner

but rather has
SYSTEM AND METHOD FOR MEASURING AIR BEARING GAP DISTANCE

CROSS REFERENCE TO RELATED CASES

This application is related to the following applications, all of which are hereby incorporated herein by reference:

U.S. patent application Ser. No. 11/004,452, entitled "ARTICULATED GAS BEARING SUPPORT PADS;" filed on Dec. 3, 2004 (the '452 application).

U.S. patent application Ser. No. 11/004,184, entitled "GAS SUPPORTED INERTIAL SENSOR SYSTEM AND METHOD;" filed on Dec. 3, 2004 (the '184 application).

BACKGROUND

Bearings, such as ball bearings, air bearings, and magnetic bearings, are commonly used to permit relative motion of one or more parts in a device. Each type of bearings has its advantages and disadvantages. For example, air bearings provide significantly less friction than ball bearings. Also, the performance of ball bearings is negatively affected by deformities in the shape of the ball bearings. However, in order to properly implement air bearings, it is often necessary to determine the air bearing gap between the air bearing and the moving part. For example, if the device is subject to vibration, knowledge of the air bearing gap distance is necessary to determine if the moving part is contacting the air bearing. If contact occurs, performance of the device will be reduced.

Air bearing gap distances vary based on the application, but the distances can be as small as $\frac{1}{1000}^{th}$ of an inch (1 mil) or less. Considering that a sheet of paper is around 3-7 mils, the small distances involved make accurate measurements difficult. In addition, current mechanical gauges used to measure the air gap distance have limitations which increase the difficulty in making accurate measurements. For example, current mechanical gauges can only measure one air bearing gap distance at a time. Current mechanical gauges also tend to have hysteresis as the gap distance changes. Hence, a curve plotting changes in gap distances is not smooth but rather has jumps between measured points which limits the ability to measure small changes in gap distance.

For the reasons stated above, and for other reasons stated below which will become apparent to those skilled in the art upon reading and understanding the present specification, there is a need in the art for an improved system and method for measuring air bearing gap distance.

SUMMARY

The above-mentioned problems and other problems are resolved by the present invention and will be understood by reading and studying the following specification.

In one embodiment, a method of determining the air gap distance between an air bearing pad and an apparatus floating on the air bearing pad is provided. The method comprises coupling a first probe to the air bearing pad; coupling a second probe to the apparatus floating on the air bearing pad, wherein the first and second probes provide the capacitance level between the air bearing pad and the apparatus; converting the capacitance level to a frequency; converting the frequency to a voltage level proportional to the air gap distance; and calculating the air gap distance based on the voltage level.

DRAWINGS

Features of the present invention will become apparent to those skilled in the art from the following description with reference to the drawings. Understanding that the drawings depict only typical embodiments of the invention and are not therefore to be considered limiting in scope, the invention will be described with additional specificity and detail through the use of the accompanying drawings, in which.

Like reference numbers and designations in the various drawings indicate like elements.

DETAILED DESCRIPTION

Figure 1:
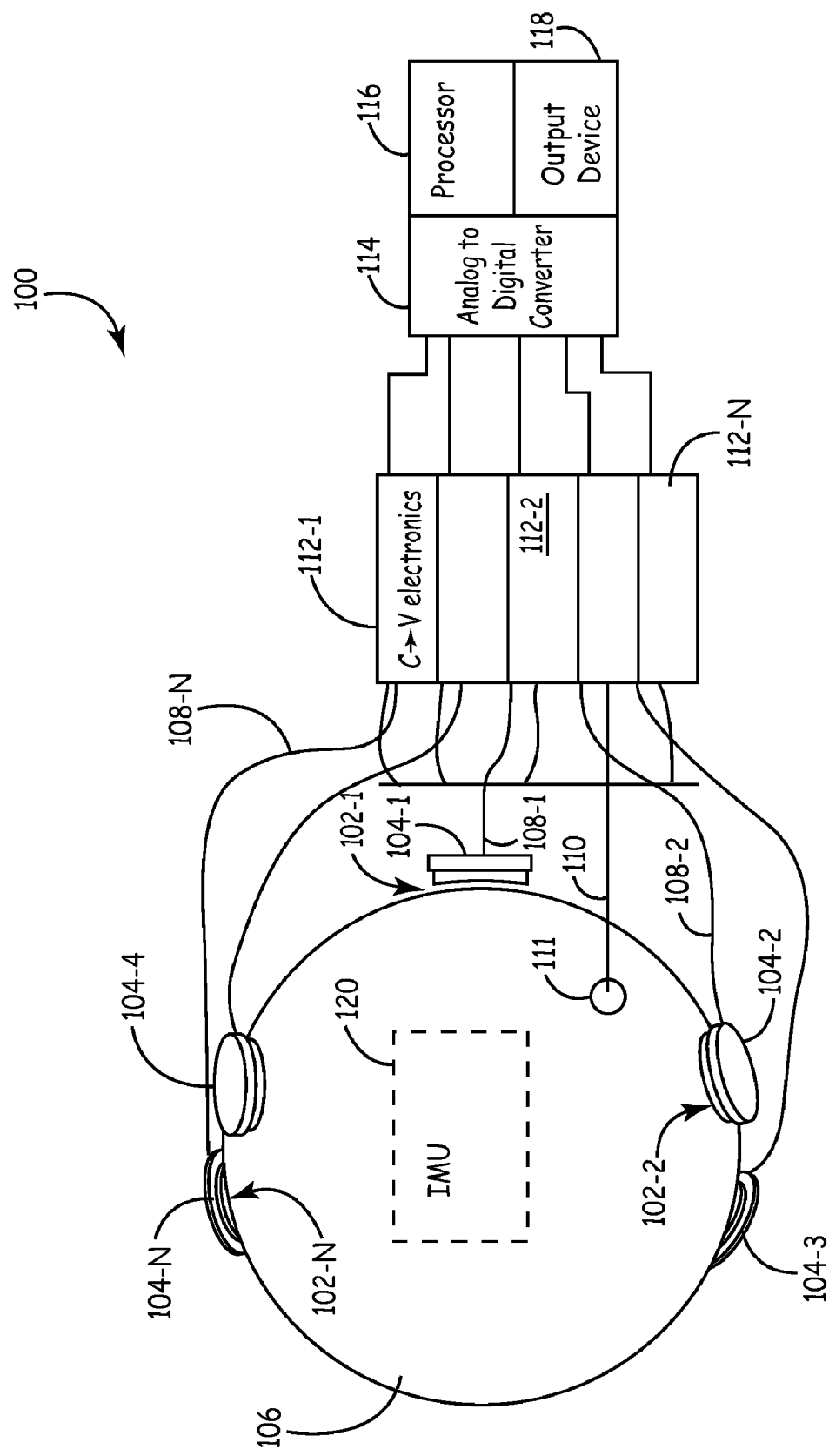
FIG. 1 is a block diagram representing a system for measuring air bearing gap distances according to one embodiment of the present invention.

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. It should be understood that the exemplary method illustrated may include additional or fewer steps or may be performed in the context of a larger processing scheme. Furthermore, the method presented in the drawing figures or the specification is not to be construed as limiting the order in which the individual steps may be performed. The following detailed description is, therefore, not to be taken in a limiting sense.

Embodiments of the present invention provide an improved system and method for measuring relatively small air gap distances. In particular, embodiments of the present invention enable simultaneous measurements of multiple air gap distances as well as smooth measurements which do not suffer from the hysteresis of typical mechanical gauges.

FIG. 1 is a block diagram of a system 100 having air bearings according to one embodiment of the present invention. System 100 is used to measure the air bearing gap distances 102-1 . . . 102-N. In this example, each gap distance 102-1 . . . 102-N separates one of air bearing pads 104-1 . . . 104-N from a sphere 106. Exemplary air bearing pads are further described in the '452 application. Inside sphere 106 is an inertial measurement unit (IMU) 120, in this embodiment, forming a spherical IMU. Sphere 106 is free to rotate in any direction due to the gap distances 102-1 . . . 102-N created by air bearing pads 104-1 . . . 104-N located around the perimeter of sphere 106. The '184 application describes the operation and interaction of the sphere 106, air bearing pads 104-1 . . . 104-N, and IMU 120.

Each of air bearing pads 104-1 . . . 104-N is coupled to an input of one of capacitance-to-voltage electronics 112-1 . . . 112-N via one of lead wires 108-1 . . . 108-N (also referred to as probes 108-1 . . . 108-N). Similarly, sphere 106 is coupled to an input of each of capacitance-to-voltage electronics 112-1 . . . 112-N via a lead wire 110 (also referred to as probe 110). In this embodiment, lead wire 110 includes a conductive brush 111 which contacts the surface of sphere 106.

Consequently, each of air bearing pads 104-1 ... 104-N combined with sphere 106 forms a pad/sphere capacitor since air bearing pads 104-1 ... 104-N and sphere 106 are made of conductive materials, such as metal, metal alloy, etc. The capacitance of each pad/sphere capacitor is a function of the air bearing gap distance 102-1 ... 102-N between each air bearing pad 104-1 ... 104-N and sphere 106. In particular, the relationship between distance and capacitance is given by the equation:

$$C = \varepsilon_r \varepsilon_o A \frac{1}{h},$$

where C is the capacitance, A is the area of the air bearing pad, $\varepsilon_r$ is the relative permittivity (dielectric constant) of air, $\varepsilon_o$ is the permittivity of vacuum, and h is the air bearing gap distance. The permittivity of vacuum, $\varepsilon_o$, and the permittivity of air, $\varepsilon_r$, are constants which when multiplied together equal $2.25 \times 10^{-13}$ farads/inch. In addition, the area A of pads 104-1 ... 104-N is 3.92 inches$^2$ in this embodiment. Therefore, as the gap distance changes for a given air bearing pad, the capacitance associated with that air bearing pad changes.

As stated above, each of lead wires 108-1 ... 108-N and lead wire 110 are coupled to capacitance-to-voltage electronics 112-1 ... 112-N. Each of capacitance-to-voltage electronics 112-1 ... 112-N includes an oscillator which generates a signal at an initial frequency. As the gap distance changes, the capacitance will change causing the frequency of the oscillator to change. In particular, the relationship between capacitance and frequency is approximated by the following equation:

$$f = \frac{1}{xC},$$

where f is the oscillator frequency, C is the capacitance, and x is a coefficient determined by the electronics. In this example, the coefficient x is approximately 11000. Capacitance-to-voltage electronics 112-1 ... 112-N include a capacitance-to-frequency converter and a frequency-to-voltage converter. The frequency-to-voltage converter outputs a voltage inversely proportional to the capacitance and, hence, proportional to the gap distance. The transfer equation for the frequency-to-voltage converter used in this embodiment is given by the equation below:

$$V = t_{os} R_{int} f \alpha,$$

where V is the average output voltage, $t_{os}$ is the pulse width of a one shot pulse, $R_{int}$ is the resistance value of an integrating resistor, f is the frequency and a is the current source. In this example, the pulse width of $t_{os}$ is 2.16 μsec, the resistance value $R_{int}$ is 11.1 KΩ, and α is 1 mA. By making appropriate substitutions in the above equations, the relationship between gap distance and measured voltage is:

$$h = \frac{\varepsilon_r \varepsilon_o A x V}{t_{os} R_{int} \alpha}$$

Inserting the values known in this example reduces the above equation to:

$$h = 4.0\overline{465} \times 10^{-4} V$$

The voltage output from each capacitance-to-voltage circuit 112-1 ... 112-N is output to an analog-to-digital converter (ADC) 114. ADC 114 converts the analog voltage into a digital signal and outputs the digital signal to processor 116. Processor 116 multiplies the digital voltage signal by the coefficient calculated above to determine the gap distance 108 for each air bearing pad 104-1 ... 104-N. In the event that one of air bearing pads 104-1 ... 104-N comes into contact with the sphere 106, the voltage output corresponding to that air bearing pad is zero. The zero voltage indicates that there is an electrical short between that air bearing pad and sphere 106 and that there is no air bearing gap.

Processor 116 includes or functions with software programs, firmware or other computer readable instructions for carrying out various methods, process tasks, calculations, and control functions, used in calculating air bearing gap distances. These instructions are typically tangibly embodied on any appropriate medium used for storage of computer readable instructions or data structures. Such computer readable media includes any available media that can be accessed by a general purpose or special purpose computer or processing unit, or any programmable logic device.

Suitable computer readable media comprise, for example, non-volatile memory devices including semiconductor memory devices such as EPROM, EEPROM, or flash memory devices; magnetic disks such as internal hard disks or removable disks (e.g., floppy disks); magneto-optical disks; CDs, DVDs, or other optical storage disks; nonvolatile ROM, RAM, and other like media. Any of the foregoing may be supplemented by, or incorporated in, specially-designed application-specific integrated circuits (ASICs). When information is transferred or provided over a network or another communications connection (either hardwired, wireless, or a combination of hardwired or wireless) to a computer, the computer properly views the connection as a computer readable medium. Thus, any such connection is properly termed a computer readable medium. Combinations of the above are also included within the scope of computer readable media.

Additionally, system 100 includes output device 118. Output device 118 outputs an indication of the measurements based on signals received from processor 116. For example, in one embodiment output device 118 is a display element which displays an indication of the measured air gap distances. In particular, in one embodiment, the actual value of the air gap distance for each air bearing 104-1 ... 104-N is displayed. For example, display element 118 displays a graph indicating changes in the gap distance 108 for each air bearing pad 104-1 ... 104-N in some embodiments. In other embodiments, an indicator, such as a visible color indicator or an audible indicator, is used instead of or in addition to the actual measured value displayed on display element 118. For example, in one embodiment, a green color indicator on display element 118 indicates that a measured air gap distance is within predefined limits and a red color indicator indicates that a measured air gap distance is not within predefined limits. Display element 118 includes any display element suitable for displaying the various symbols and information for the operation of embodiments of the present invention. There are many known display elements that are suitable for this task, such as various CRT, active and passive matrix LCD, and plasma display systems.

Hence, system 100 enables various advantages over typical mechanical gauges. For example, system 100 enables measuring the gap distance 108 of multiple air bearing pads 104-1 ... 104-N simultaneously whereas typical mechanical gauges are only capable of measuring the gap distance 108 of air bearing pads 104-1 ... 104-N one at a time. In addition, because system 100 is able to detect and measure small changes in distance more precisely than typical mechanical gauges, system 100 is able to plot smooth graphs and does not tend to suffer from hysteresis due to jumps in measured distances as with typical mechanical gauges. The above advantages also enable system 100 to measure the sphericity of sphere 106 (or planarity of a plane in other embodiments). As sphere 106 is rotated, system 100 can measure small changes in gap distance and plot smooth curves of the changes. This enables system 100 to locate small deformities in the shape of sphere 106.

Also, in some embodiments, system 100 is included in a product with air bearings, such as the inertial sensor system described in the '184 application, to perform periodic health monitoring. For example, system 100 can continually measure gap distances 108 to determine if any of the gap distances are becoming too small or large. In particular, variances in gap distances 108 can indicate problems such as excessive vibration, loss of air pressure in an air bearing pad 104 due to clogging or failure, etc. For example, if an air bearing pad comes into contact with the sphere, the voltage output corresponding to the air bearing pad is zero. The zero voltage output indicates no air bearing gap distance which can be caused by loss of air pressure, etc. Therefore, embodiments of the present invention enable real-time health monitoring which monitoring is not available using typical mechanical gauges.

Figure 2:
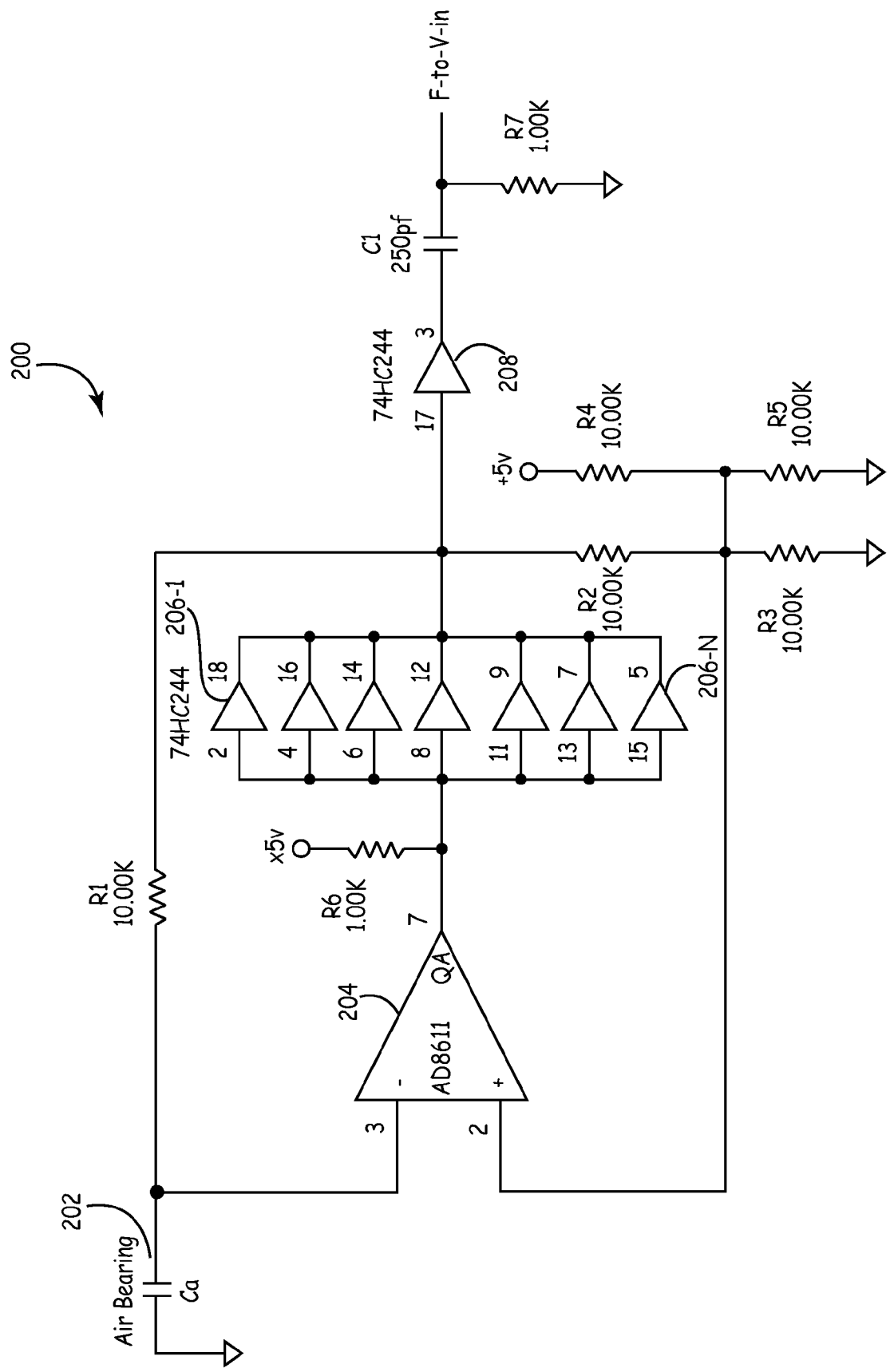
FIG. 2 is a circuit diagram showing one embodiment of a capacitance-to-frequency converter.

FIG. 2 is a circuit diagram showing one embodiment of a capacitance-to-frequency converter 200 used in the capacitance-to-voltage electronics 112 discussed above in FIG. 1. Air bearing capacitance 202 is the capacitance between an air bearing pad and the surface of the sphere shown in FIG. 1. The capacitance is input into comparator 204. Comparator 204 is a high speed comparator (such as Analog Device's AD8611) which forms the basis of an oscillator. The output of comparator 204 oscillates due to resistors R1-R5. In particular, resistors R1 and R2 provide feedback to comparator 204. Resistor R1 is an oscillator timing resistor and contributes to the change in frequency. In this embodiment, resistor R1 is a 10 KΩ resistor. Resistors R3, R4, and R5 set the bias point of comparator 204. Resistor R2 provides feedback which changes the switching threshold of comparator 204 above and below the bias point which is set by resistors R3, R4, and R5. In this embodiment, resistors R2, R3, R4, and R5 are each 10 KΩ resistors. The minimum oscillator frequency in this embodiment is 9.091 KHz and the maximum oscillator frequency is 303.030 KHz. As the capacitance 202 changes, the oscillator frequency also changes. In particular, as the capacitance increases, the oscillator frequency decreases and vice versa.

Resistor R6 is a pull-up resistor coupled to a positive 5 volt supply, in this embodiment. Buffers 206-1 . . . 206-N are coupled in parallel to decrease the single-buffer output impedance voltage drop so that resistors R1 and R2 see voltages closer to the +5.0V rail and ground. In this embodiment, there are 7 buffers 206 coupled in parallel. Additionally, in this embodiment, each of buffers 206-1 . . . 206-N is a Phillip's Semiconductor octal non-inverting buffer, part number 74HC244.

Capacitor C1 and resistor R7 form a high-pass filter which differentiates the oscillator square wave. In this embodiment, capacitor C1 is 250 pF capacitor and resistor R7 is a 1 KΩ resistor. Buffer 208 is located between capacitor C1 and the intersection of resistors R2 and R1. Buffer 208 buffers the oscillator timing components from the high pass filter formed by capacitor C1 and resistor R7. In this embodiment, buffer 208 is also a Phillip's Semiconductor octal non-inverting buffer, part number 74HC244. The generated frequency is output from capacitance-to-frequency converter 200 to a frequency-to-voltage converter.

Figure 3:
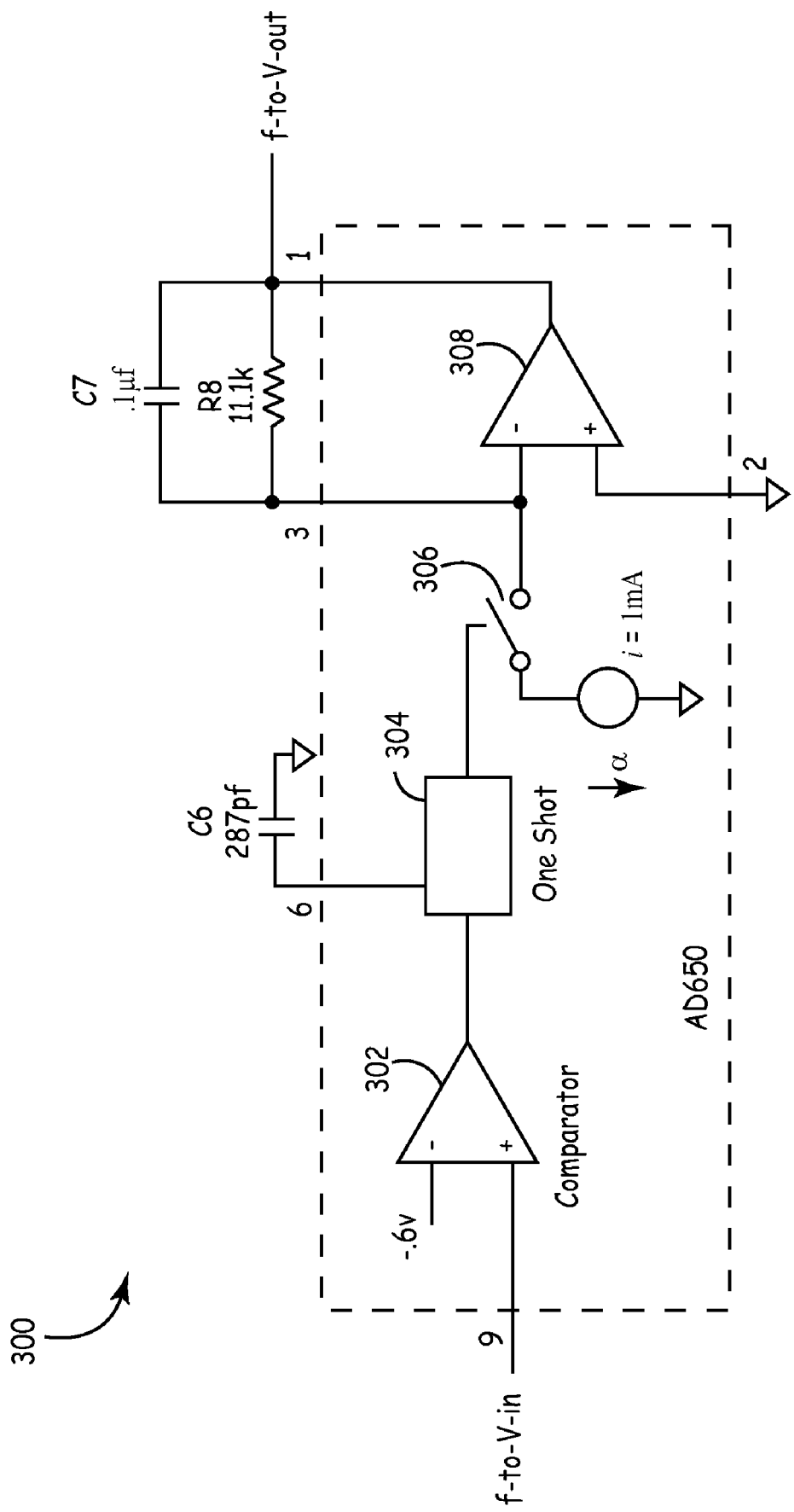
FIG. 3 is a circuit diagram showing one embodiment of a frequency-to-voltage converter.

FIG. 3 is a circuit diagram showing one embodiment of a frequency-to-voltage converter 300. In this embodiment, frequency-to-voltage converter 300 is an Analog Device's AD650 frequency-to-voltage converter. Frequency-to-voltage converter 300 comprises a comparator 302 which receives a reference signal and the output frequency from capacitance-to-frequency converter 200. In this embodiment, the reference signal is −0.6V. Hence, comparator 302 is triggered when a negative pulse which passes −0.6V is received from capacitance-to-frequency converter 200. When comparator 302 is triggered, it outputs a signal which activates one shot pulse generator 304. One shot pulse generator 304 outputs a pulse of fixed width each time it is activated. Capacitor C6 sets the pulse width of one-shot pulse generator 304. In this embodiment, capacitor C6 has a value of 287 pF which sets the pulse width at 2.16 µs.

Each one-shot pulse closes switch 306 which provides 1 mA to an input of op amp 308 for the duration of the one-shot pulse. As the frequency increases, the amount of charge provided to op amp 308 increases. Capacitor C7 integrates the pulse train output from op amp 308 and sets the overall response time of the capacitance-to-voltage electronics. Resistor R8 sets the gain of frequency-to-voltage converter 300. Hence, frequency-to-voltage converter 300 produces a voltage that is proportional to the input frequency and, consequently, to the capacitance of the air bearing pad and sphere. A processor, such as processor 116, can then use the output voltage to calculate the actual capacitance as described above.

Figure 4:
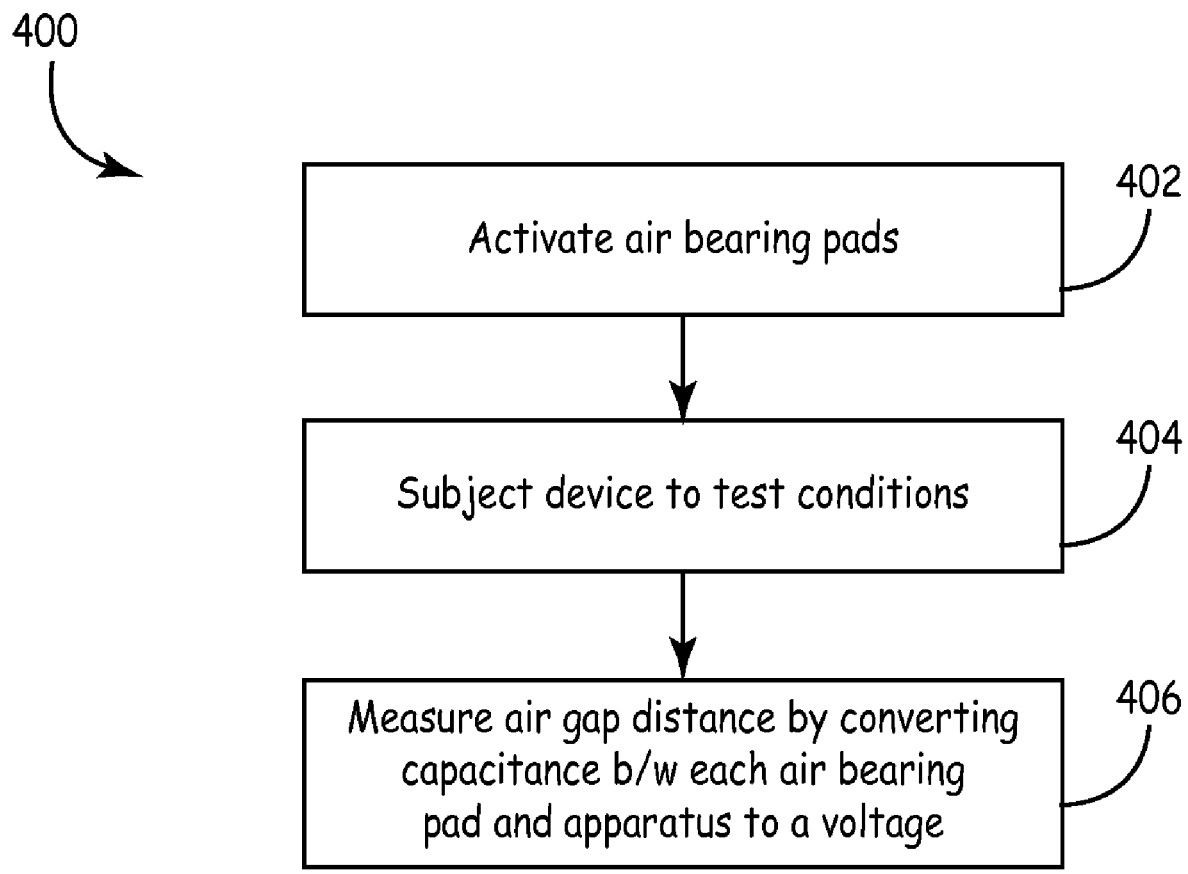
FIG. 4 is a flow chart showing a method of testing a device having an air bearing according to one embodiment of the present invention.

FIG. 4 is a flow chart showing a method 400 of testing a device having air bearings (such as sphere 106 with air bearing pads 104) according to one embodiment of the present invention. At 402, the air bearing pads are activated. Activation of the air bearing pads causes each to produce sufficient air pressure to lift an apparatus (such as a spherical IMU) off the air bearing pads, separating the apparatus from each air bearing pad by an air gap. At 404, the device is subjected to test conditions while the air bearing pads are activated. Exemplary test conditions include, but are not limited to, vibration, rotation, and rest intervals. For example, rotation includes rotation of the entire device or rotation of the apparatus. Rest intervals are used, in some embodiments, to provide reference air gap distances which are compared to air gap distances measured under other conditions.

While the device is subjected to test conditions, the distance of each air gap is measured at 406. In particular, each air gap distance is measured by converting the capacitance between each air bearing pad and the apparatus to a voltage which is proportional to the respective air gap distance. One embodiment of a method of measuring the air gap distances is described in more detail in FIG. 5. In some embodiments, the air gap distance for all the air bearing pads is measured simultaneously. In addition, measuring the air gap distances during test conditions helps to identify problems. For example, in some embodiments, the air gap distances measured while rotating the apparatus are analyzed to determine the sphericity (or planarity) of the apparatus. Since the air gap distances are very small, it is important to have a uniform shape because indentations or deformities in the surface of the apparatus can cause the apparatus to come into contact with the air bearing pads. Similarly, measuring the air gap distances can indicate problems with the air bearing pads such as loss of air pressure.

Figure 5:
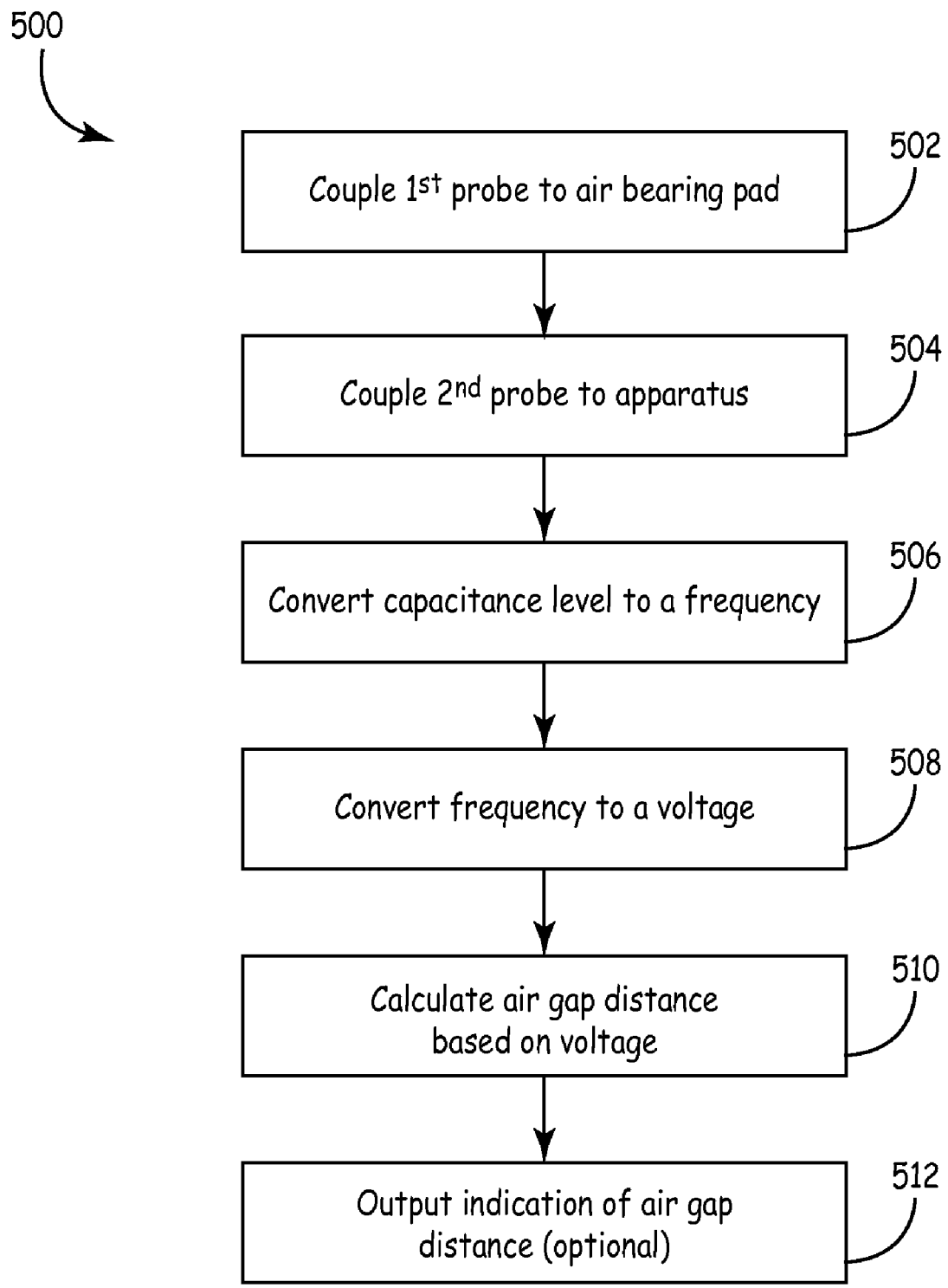
FIG. 5 is a flow chart showing a method of determining air bearing gap distances according to one embodiment of the present invention.

FIG. 5 is a flow chart showing a method of determining air bearing gap distances according to one embodiment of the present invention. Method 500 can be implemented using a system such as system 100 described above. At 502, a first probe is coupled to an air bearing pad. At 504, a second probe is coupled to an apparatus, such as a spherical IMU (e.g. IMU 120 in sphere 106 above). In some embodiments, the second probe is a conductive brush. The first and second probes provide the capacitance level between the air bearing pad and the apparatus to a capacitance-to-frequency converter, such as capacitance-to-frequency converter 200. At 506, the capacitance level is converted to a frequency in the capacitance-to-voltage converter. At 508, the frequency is converted in a frequency-to-voltage converter, such as frequency-to-voltage converter 300, to a voltage which is proportional to the air gap distance.

At 510, the voltage is provided to a processor, such as processor 116, where the air gap distance is calculated based on the voltage as described above. In some embodiments, the voltage is converted to a digital signal in an analog-to-digital converter before being provided to the processor. At 512, the calculated air gap distance is optionally output to an output device. Exemplary output devices include, but are not limited to, a display element, an audio device, etc. For example, in some embodiments, a display element plots the air gap distance on a graph based on signals from the processor. Similarly, in other embodiments, the display element displays a color indicator of the air gap distance or the actual calculated air gap distance value based on signals from the processor. In another embodiment, an audio device produces an audible signal indicating the air gap distance based on signals from the processor. For example, the audio device produces a first audible signal if the calculated air gap distance is within predefined limits and a second audible signal as a warning if the calculated air gap distance is not within predefined limits.

Hence, embodiments of the present invention provide an improved system and method for measuring relatively small air gap distances. Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A method of determining the air gap distance between an air bearing pad and an apparatus floating on the air bearing pad, the method comprising:
    coupling a first probe to the air bearing pad;
    coupling a second probe to the apparatus floating on the air bearing pad, wherein the first and second probes provide the capacitance level between the air bearing pad and the apparatus;
    converting the capacitance level to a frequency;
    converting the frequency to a voltage level proportional to the air gap distance; and
    calculating the air gap distance based on the voltage level.

2. The method of claim 1, wherein coupling a second probe to the apparatus comprises coupling a conductive brush to the apparatus.

3. The method of claim 1, wherein coupling a second probe to the apparatus comprises coupling a second probe to a spherical inertial measurement unit (IMU).

4. The method of claim 1, further comprising outputting the calculated air gap distance to an output device.

5. The method of claim 4, wherein outputting the calculated air gap distance includes at least one of plotting the air gap distance on a graph on a display element, producing an audible signal indicating the air gap distance, displaying a color indicator of the air gap distance on the display element, and displaying the calculated air gap distance value on the display element.

6. The method of claim 5, wherein producing an audible signal includes
    producing a first audible signal if the calculated air gap distance is within predefined limits; and
    producing a second audible signal if the calculated air gap distance is not within the predefined limits.

7. A method of testing a device having air bearings, the method comprising:
    activating air pressure in a plurality of air bearing pads located around an apparatus in the device to cause the apparatus to float, the apparatus being separated from each air bearing pad by an air gap;
    subjecting the device to test conditions; and
    calculating the distance of the air gap between each of the plurality of air bearing pads and the apparatus while the device is subjected to test conditions by converting the capacitance between each air bearing pad and the apparatus to a voltage proportional to the respective air gap distance.

8. The method of claim 7, wherein calculating the air gap distance includes:
    coupling a first probe to each of the plurality of air bearing pads;
    coupling a second probe to the apparatus floating on the plurality of air bearing pads,
    converting the capacitance between each first probe and the second probe to a frequency;
    converting each frequency to a voltage proportional to the respective air gap distance; and
    calculating each air gap distance using the respective voltage level.

9. The method of claim 8, wherein coupling the second probe comprises coupling a conductive brush to the apparatus.

10. The method of claim 7, wherein activating air pressure in the plurality of air bearing pads located around the apparatus includes activating air pressure in the plurality of air bearing pads located around a spherical inertial measurement unit (IMU).

11. The method of claim 10, further comprising analyzing the results of the air gap calculations to determine the sphericity of the spherical IMU.

12. The method of claim 7, wherein subjecting the device to test conditions subjecting the device to at least one of vibration, rotation, and a rest interval.

13. The method of claim 7, wherein calculating the air gap distance between each of the plurality of air bearing pads and the apparatus comprises calculating the air gap distance between each of the plurality of air bearing pads and the apparatus simultaneously.

14. The method of claim 7, further comprising outputting each calculated air gap distance to an output device.

15. The method of claim 14, wherein outputting each calculated air gap distance includes at least one of plotting each air gap distance on a graph on a display element, producing an audible signal which indicates if at least one air gap distances is not within predefined limits, displaying a color indicator on the display element which indicates if at least one of the air gap distances is not within predefined limits, and displaying the value of each calculated air gap distance on the display element.

16. A system comprising:

an air bearing pad;

an apparatus separated from the air bearing pad by an air gap when air pressure is activated in the air bearing pad;

a first probe coupled to the air bearing pad;

a second probe coupled to the apparatus, wherein the first and second probes provide a capacitance level between the air bearing pad and the apparatus;

at least one capacitance-to-voltage electronics configured to convert the capacitance between the air bearing pad and the apparatus separated from the air bearing pad by the air gap to a voltage proportional to the distance of the air gap; and a processor configured to calculate the air gap distance between the air bearing pad and the apparatus based on the voltage received from the at least one capacitance-to-voltage electronics.

17. The system of claim 16, wherein the apparatus is a spherical inertial measurement unit (IMU).

18. The system of claim 16, wherein the at least one capacitance-to-voltage electronics comprises a capacitance-to-frequency converter and a frequency-to-voltage converter.

19. The system of claim 16, wherein the processor is configured to analyze the air gap distance to detect one of excessive vibration and loss of air pressure in the air bearing pad.

20. The system of claim 16, further comprising an output device configured to output an indication of the calculated air gap distance based on signals received from the processor.

* * * * *